(12) United States Patent
Maeda et al.

(10) Patent No.: US 6,508,378 B1
(45) Date of Patent: Jan. 21, 2003

(54) POLYCARBONATE RESIN PELLET TANK TYPE CONTAINER AND TRANSPORTATION METHOD USING THE SAME

(75) Inventors: Kenichi Maeda, Osaka (JP); Kouhei Ogawa, Osaka (JP); Akira Kazamoto, Tokyo (JP)

(73) Assignees: Nippon Aluminum Co, Osaka (JP); Teijin Chemicals Ltd, Tokyo (JP)

( * ) Notice: Subject to any disclaimer, the term of this patent is extended or adjusted under 35 U.S.C. 154(b) by 0 days.

(21) Appl. No.: 09/869,823

(22) PCT Filed: Nov. 18, 1999

(86) PCT No.: PCT/JP99/06451

§ 371 (c)(1),
(2), (4) Date: Jul. 6, 2001

(87) PCT Pub. No.: WO00/41950

PCT Pub. Date: Jul. 20, 2000

(30) Foreign Application Priority Data

Nov. 1, 1999 (JP) .......................................... 11-003876

(51) Int. Cl.[7] .............................................. B65D 90/00
(52) U.S. Cl. ................. 220/560.07; 220/1.5; 220/567.2
(58) Field of Search .............................. 220/1.5, 560.07, 220/567.2

(56) References Cited

U.S. PATENT DOCUMENTS

| | | | |
|---|---|---|---|
| 3,661,293 A | | 5/1972 | Gerhard et al. |
| 3,677,021 A | * | 7/1972 | Bognaes et al. .......... 114/74 A |
| 4,591,064 A | | 5/1986 | Gerhard |
| 4,685,327 A | * | 8/1987 | Sharp ...................... 220/56.03 |
| 4,960,222 A | * | 10/1990 | Fields, III ............... 220/560.03 |
| 5,282,546 A | * | 2/1994 | Bauer ..................... 220/560.03 |
| 5,884,709 A | * | 3/1999 | Evans et al. .................. 169/46 |
| 6,340,269 B1 | * | 1/2002 | Stanton et al. .............. 137/312 |

FOREIGN PATENT DOCUMENTS

| | | |
|---|---|---|
| EP | 0289646 | 8/1987 |
| JP | 57-164086 | 4/1956 |
| JP | 53-2189 | 1/1978 |
| JP | 2-6711 | 2/1990 |

* cited by examiner

*Primary Examiner*—Joseph M. Moy
(74) *Attorney, Agent, or Firm*—Sherman & Shalloway

(57) ABSTRACT

The tank type container of the present invention comprises a long, horizontally placed, drum-shaped tank 3 and a parallelopiped container frame 5 surrounding the tank 3. The tank 3 is provided with a charging tube 20 at the top of the longitudinal front end, a discharging tube 21 at the bottom of the longitudinal back end, and, at the outside, an air-supplying apparatus for supplying compressed air into the tank to discharge polycarbonate resin pellets. The tank 3, the charging tube 20, the discharging tube 21 and the air-supplying apparatus are accommodated in a space surrounded by the container frame 5. The container frame 5 is provided with metal fitting members 6 for locking engagable with a locking mechanism possessed by the bed of a trailer. Therefore, the present tank type container is usable as a large-capacity container for land transportation and sea transportation, allowing for improved efficiency in transportation of polycarbonate resin pellets.

3 Claims, 7 Drawing Sheets

POLYCARBONATE RESIN PELLET TANK TYPE CONTAINER AND TRANSPORTATION METHOD USING THE SAME

TECHNICAL FIELD OF THE INVENTION

The present invention relates to a tank type container used for filling and transporting polycarbonate resin pellets, and a method for transporting polycarbonate resin pellets using the container. More particularly, the present invention relates to a tank type container for polycarbonate resin pellets, usable for land or marine transportation of polycarbonate resin pellets, and a method for transporting polycarbonate resin pellets using the container.

PRIOR ARTS

In transporting polycarbonate resin pellets in a small volume, there is used a small container having a tetragonal tank 50, such as shown in FIG. 9, or a container having, in place of the tetragonal tank 50, a vertical, compressed drum-shaped tank. In each container, an charging inlet 51 is provided at the top end of the tank, a discharging valve 54 is provided at the bottom end of the tank via a hopper 53, and a supporting frame 55 is provided for stabilizing the tank.

In transporting polycarbonate resin pellets in a large volume, there is used a long, horizontally placed, drum-shaped tank 57 such as shown in FIG. 10, which is fixed directly (with no fitting) to the dumping type bed 58 of a truck or a trailer and is provided as a so-called tank lorry.

The tank 57 has a charging tube 62 for polycarbonate resin pellets at the top of the front end and, at the bottom of the back end, a discharging tube 65 via a hopper 63. The bed 58 can be inclined by the extension of a hydraulic cylinder 59 in such a state that the front is elevated.

PROBLEM TO BE SOLVED BY THE INVENTION

In the case of the tetragonal small container of FIG. 9, it is possible to produce only a small-volume container, for the strength required; therefore, a number of containers need to be mounted and transported on a truck or a trailer; this requires much labor in handling and makes low transportation efficiency. Further, to accommodate the hopper 53 and the discharging valve 54, there are required a large space, resulting in low utilization of space.

The small container having a vertical, compressed drum-shaped tank is stronger than the tetragonal container of FIG. 9; however, it can not be produced so as to have a large volume because, even if it is produced in a larger diameter for a larger volume, efficient mounting thereof on the rectangular bed of a truck is difficult. Its production of the tank having a larger height is also difficult in view of the height restriction and safety of the truck or the like.

In the case of a long, drum-shaped tank 57 mounted horizontally on the bed of a tank truck of FIG. 10, it can be produced in a large capacity from the standpoint of the strength and the shape compatibility with the bed 58 of the truck. However, since the tank 57 is permanently fusion-bonded to the bed 58 of the truck, it is usable for land transportation but is not usable for marine transportation.

Further, since the tank 57 is mounted with no fitting, there is a high risk that the tank 57 and the belongings (e.g. a discharging tube 65) provided on the surface thereof collide with external substances and are damaged.

Furthermore, one truck is required for one tank 57, which is low in economical efficiency.

Polycarbonate resin pellets particularly for optical use vibrate and collide with each other by vibration during the transportation, and inevitably generate a fine powder. When such a fine powder is present in polycarbonate resin pellets for optical use to be molded in a certain amount or more, the optical disc molded therefrom has various defects as a recording material, owing to the formation of silver streaks, the generation of carbides, etc.

OBJECTS OF THE INVENTION

The objects of the present invention are to provide a tank type container of large capacity which has a sufficient strength, which can be protected from the contact of the belongings with external substances, and which can transport polycarbonate resin pellets by land or by sea efficiently while suppressing the generation of a fine powder; and a method for transporting polycarbonate resin pellets using such a container.

MEANS FOR ACHIEVING THE OBJECTS

According to the study by the present inventors, the above object of the present invention is achieved by a tank type container for polycarbonate resin pellets, comprising a long, horizontally placed, drum-shaped tank and a parallelopiped container frame surrounding the tank, wherein the tank is provided with a charging tube at the top of the longitudinal front end, a discharging tube at the bottom of the longitudinal back end, and an air-supplying apparatus for supplying compressed air into the tank, at the outside, the tank, the charging tube, the discharging tube and the air-supplying apparatus are accommodated in a space surrounded by the container frame, the container frame is provided, at the bottom corners, with metal fitting members for locking engagable with a locking mechanism possessed by the bed of a trailer, and the charging tube is projected forward and upward from the tank, the discharging tube is projected backward and upward from the tank, and when the tank is inclined in such a state that the front end is elevated, the charging tube is directed upward and the discharging tube is directed almost horizontally and backward.

The present invention also includes a tank type container according to the above, wherein the air-supplying apparatus comprises air-injecting tubes provided at the front end top of the tank and the back end bottom of the tank, an air-blowing tube connected to a compressed air source, provided at the back of the tank, and tubes for sending air under pressure, provided along the surface of the tank so as to diverge from the air-blowing tube and extend as far as each air-injecting tubes.

The present invention further includes a method for transporting polycarbonate resin pellets using the above tank type container for polycarbonate resin pellets.

MODE FOR CARRYING OUT THE INVENTION

Figure 1:
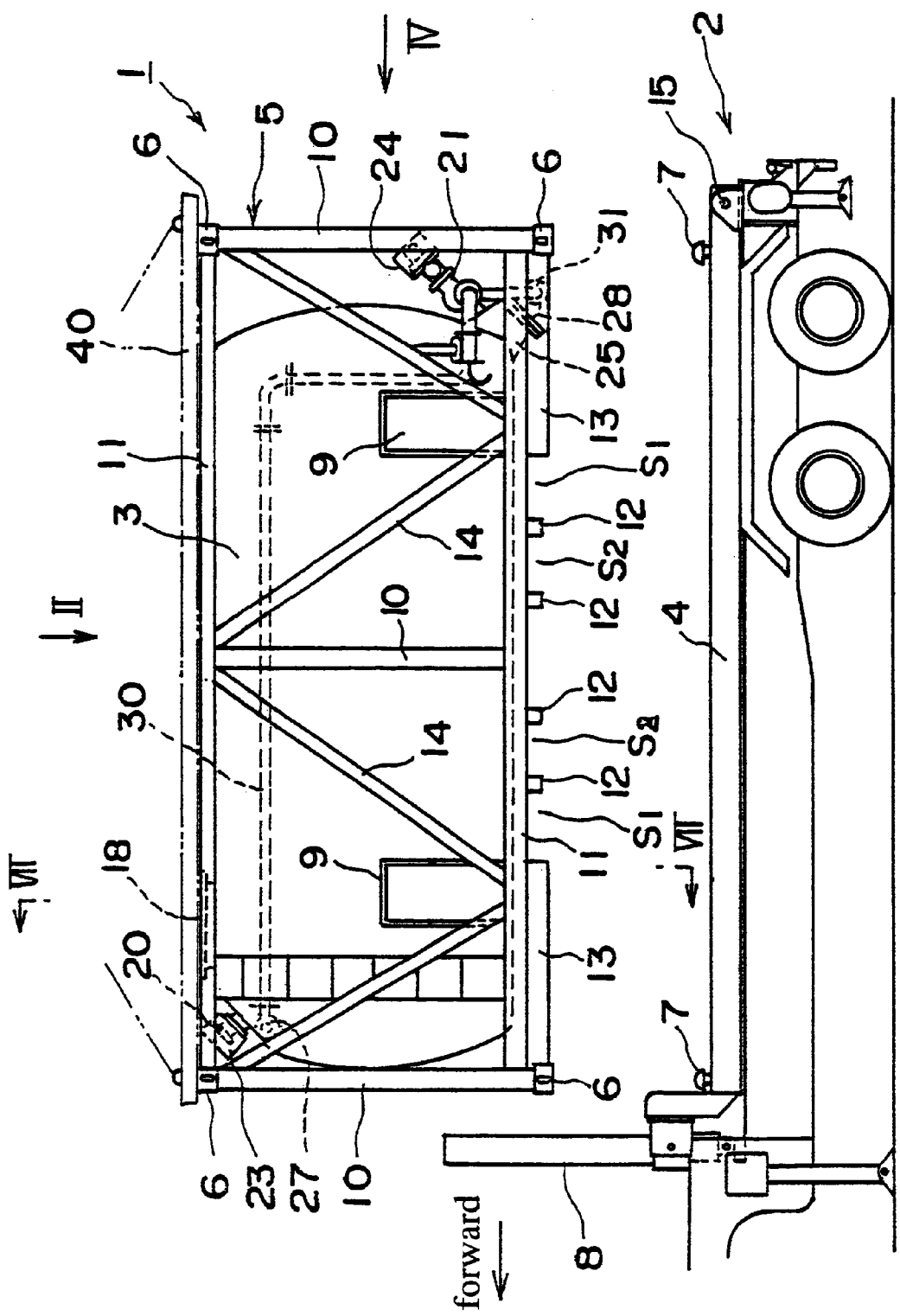
FIG. 1 is side views of a tank type container for polycarbonate resin pellets according to the present invention, and a trailer.

FIG. 1 is side views of a tank type container 1 according to the present invention, used for transporting polycarbonate resin pellets, and a trailer 2 used for mounting the container 1 detachably. The trailer 2 has a bed 4 of dumping type. The back end of the bed 4 is supported via a hinge 15 so as to be rotatable about the hinge 15; the front end of the bed 4 is supported via a multi-stage type hydraulic cylinder 8 so as to be ascendable and descendable; the bed 4 can be inclined by the extension of the hydraulic cylinder 8 in such a state that the front portion is elevated so as to enable dumping. The bed 4 has, at the four corners of the upper surface, mushroom-shaped locking member 7 which are projected upward and can rotate about the vertical axes.

The tank type container 1 comprises a long, drum-shaped tank 3 and a parallelopiped container frame 5 surrounding the tank 3. The container frame 5 has a parallelopiped shape which is long in the axial direction of the tank. To each corner of the container frame 5 is welded a block-shaped metal fitting member 6 for locking. The container frame 5 is constituted by vertical pipes 10; long, forward and backward horizontal pipes 11 extending in the axial direction of the tank 3; diagonal brace pipes 14 connecting the upper and lower horizontal pipes 11 for reinforcement; and horizontal connecting pipes 12 connecting the left and right horizontal pipes 11. All of these pipes are rectangular pipes. At the bottom of the container frame 5 are secured spaces S1 and spaces S2 each for allowing insertion of the nails of a forklift.

Figure 7:
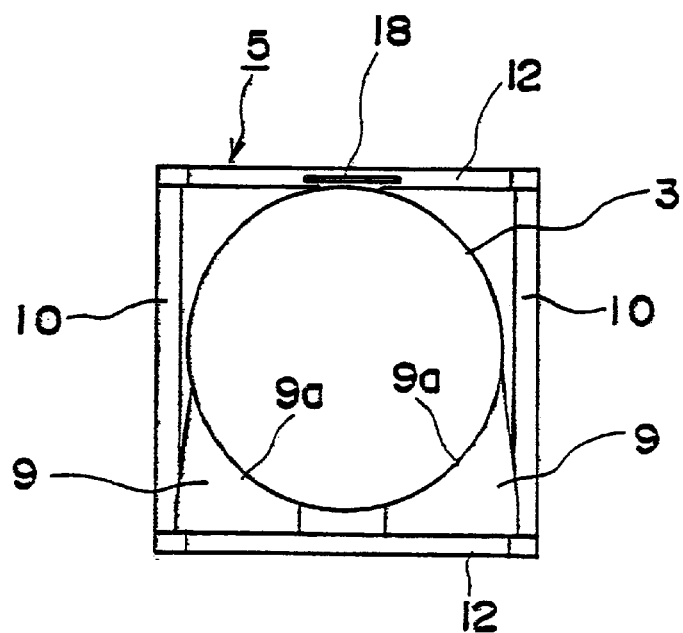
FIG. 7 is a sectional view taken at a VII—VII plane of FIG. 1.
Figure 9:
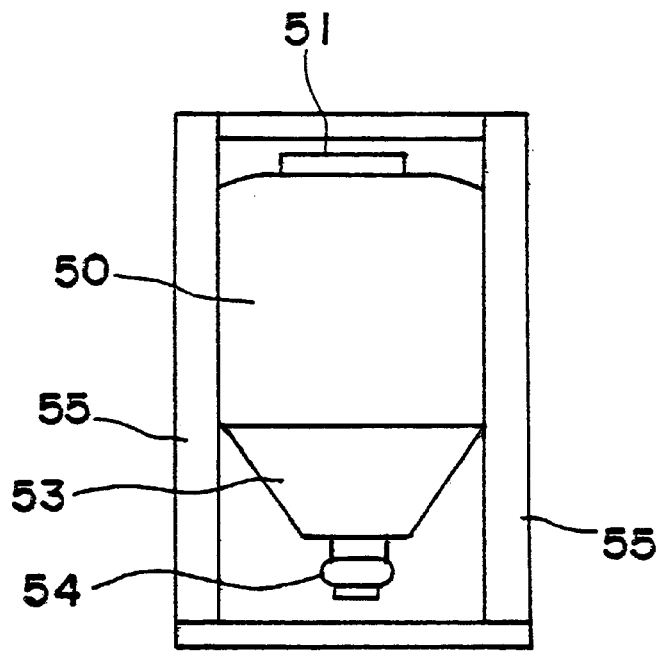
FIG. 9 is a front view of a conventional container.

To the inside of the container frame 5 are fitted, by fusion bonding, two pairs (a front pair and a back pair) of holders 9 for mounting the tank thereon. Each holder 9 has an arc-shaped surface 9a as shown in FIG. 7. To each surface 9a is fitted and welded the long, drum-shaped tank 3 in a horizontally placed state.

The tank 3 is horizontally placed in such a state that the drum axis is directed forward and backward, as shown in FIG. 1. The tank 3 has, at the top of the front end, a charging tube 20 for feeding polycarbonate resin pellets into the tank 3; at the bottom of the back end, a discharging tube 21 for discharging the polycarbonate resin pellets; at the top of the front portion, a manhole 18. The charging tube 20 is projected forward and upward and has a cap 23 when not in operation. The discharging tube 21 is fitted to a hopper 25 formed at the bottom of the back end of the tank 3, so as to be projected backward and upward, and has a cap 24 when not in operation. The charging tube 20 is projected forward and upward at an angle of about 45° relative to a horizontal line; the discharging tube 21 is projected backward and upward at an angle of about 45° relative to a horizontal line; when the container is inclined at an angle θ of about 45° relative to a horizontal line by elevating the front end as shown in FIG. 3, the charging tube 20 is directed vertically and the discharging tube 21 is directed backward and horizontally.

The tank 3 is provided with a compressed air-supplying apparatus. The compressed air-supplying apparatus comprises an anterior air-injecting tube 27 (shown in FIG. 1) having an opening in the tank 3, provided at the side of the front end top of the tank 3; a posterior air-injecting tube 28 (shown in FIG. 1) connected to the front end of the hopper 25 at the back end bottom of the tank 3; and an air-blowing tube 29 (shown in FIG. 2) provided at the back portion of the tank 3. The air-blowing tube 29 diverges into a left tube 30 for sending air under pressure and a right tube 31 for sending air under pressure, via a T-shaped tube 32. The air-sending tube 30 ascends at the side of the tank 3, extends forward along the surface of the tank 3, and is connected to the anterior air-injecting tube 27. The air-sending tube 31 is connected, as shown in FIG. 4, to the posterior air-injecting tube 28 and also to a safety valve 35 via a branch tube 33.

Figure 8:
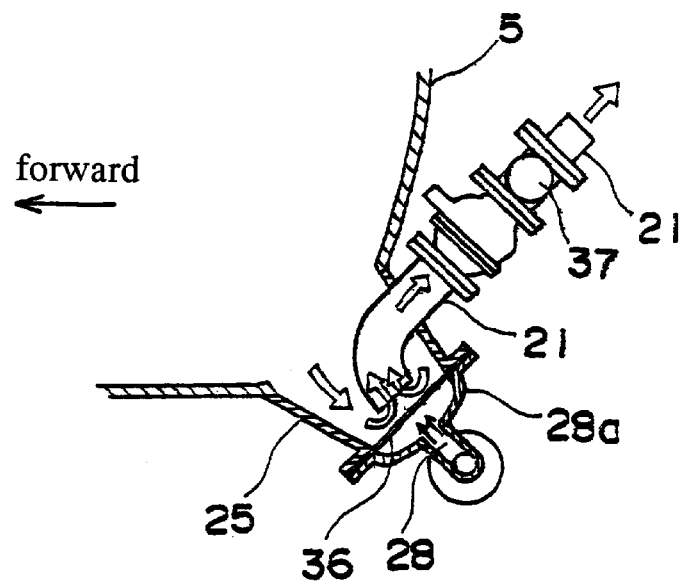
FIG. 8 is a vertical sectional enlarged view of a discharging hopper.

FIG. 8 is a vertical sectional enlarged view of the hopper 25. To an opening at the front end of the hopper 25 is connected an enlarged opening 28a of the posterior air-injecting tube 28 via a filter 36. The discharging tube 21 is bent inside the hopper 25 so as to face the air-injecting tube 28. The discharging tube 21 is provided with a switching valve 37, at the middle.

Figure 3:
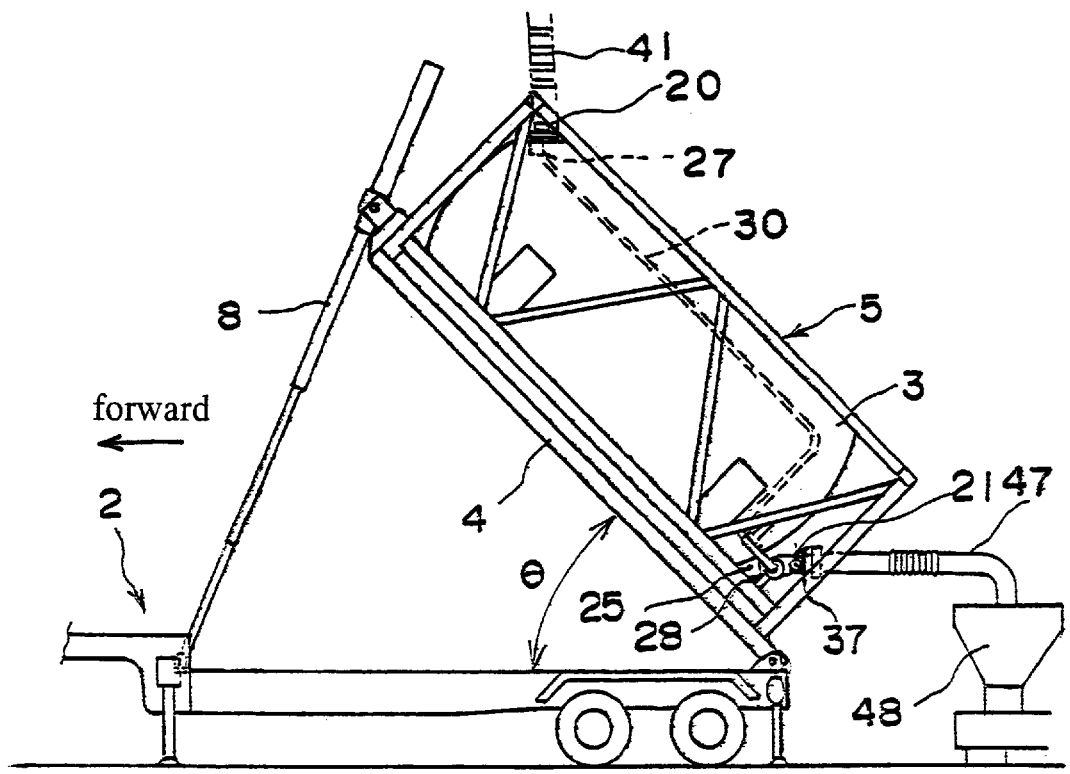
FIG. 3 is side views of a tank type container for polycarbonate resin pellets and a trailer, both shown in a dumping state.
Figure 4:
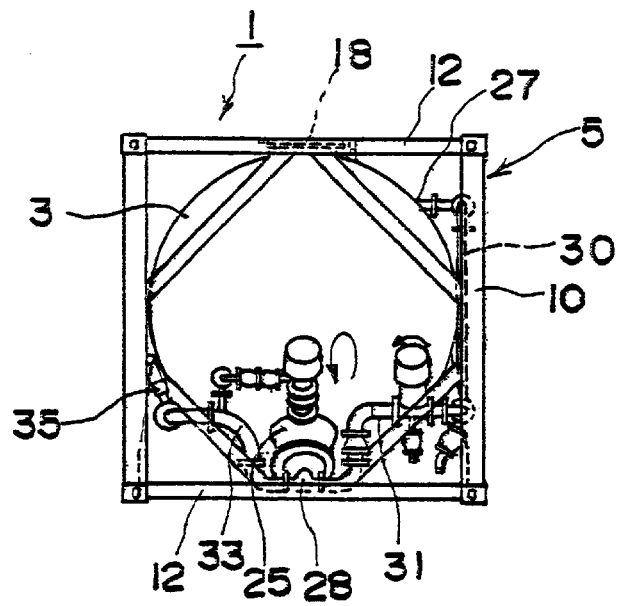
FIG. 4 is a view seen from a position IV of FIG. 1.

As shown in FIG. 1, FIG. 3 and FIG. 4, the tank 3, the charging tube 20, the discharging tube 21, the manhole 18 and the air-supplying apparatus are completely accommodated within the longitudinal width, transverse width and vertical width of the container frame 5, and are not projected outside from the space surrounded by the container frame 5.

Figure 2:
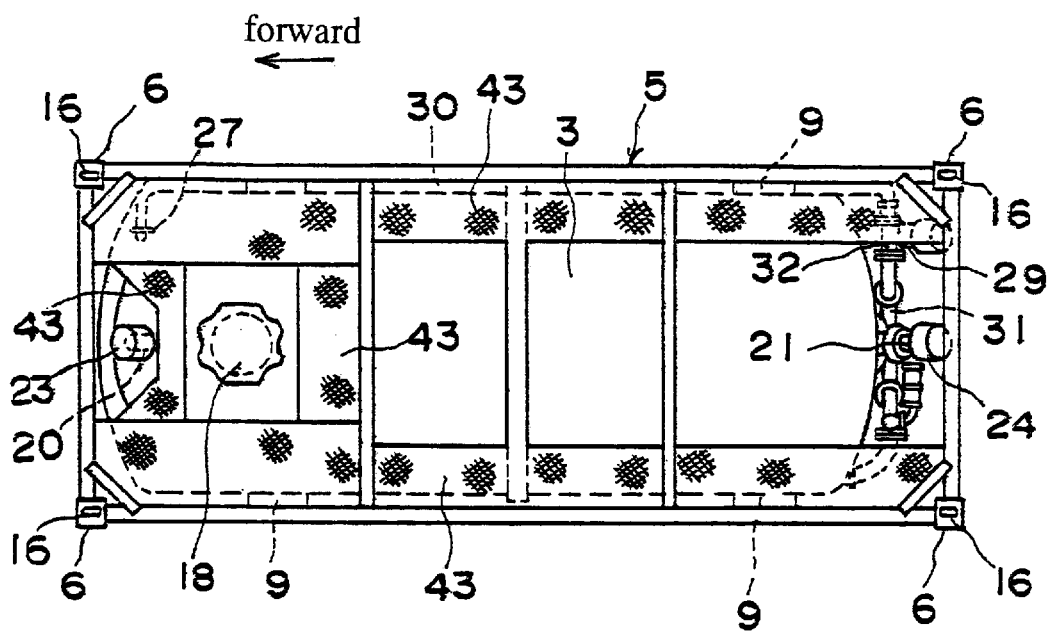
FIG. 2 is a view seen from a position II of FIG. 1.
Figure 5:
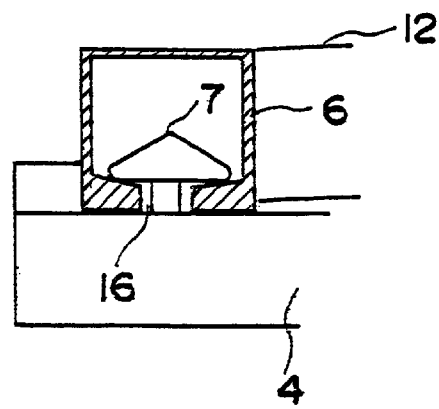
FIG. 5 is a vertical sectional view of a metal fitting member for locking.
Figure 6:
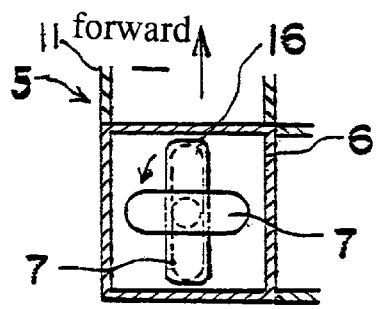
FIG. 6 is a horizontal sectional view of a metal fitting member for locking.

FIG. 5 is a vertical sectional view of the metal fitting member 6 for locking provided at the bottom corner of the container frame 5, and FIG. 6 is a horizontal sectional view of the metal fitting member. The metal fitting member 6 for locking is formed in a hollow box shape and has a long hole 16 (long in the anterior and posterior direction of FIG. 6) in the lower wall. Meanwhile, the locking member 7 is formed in an long shape having round edges so as to be able to pass through the long hole 16 and, by being passed through the long hole 16 in a state of the anterior and posterior direction of FIG. 6 (a state shown by a dotted line) and then being rotated by 90° about the vertical axis of the member 7 until becoming a state of the left and right direction of FIG. 6 (a state shown by a solid line), can press the metal fitting member 6 for locking, against the bed 4 to fix the metal fitting member 6, as shown in FIG. 5. Incidentally, each metal fitting member 6 for locking provided at each upper corner of the container frame 5 has a long hole 16 in the upper wall, as shown in FIG. 2.

At the top of the container frame 5 may be provided platforms 43 made of a punching metal or a steel plate, at the left and right portions along the left and right upper horizontal pipes 11 and also in front of and behind the manhole 18.

Figure 11:
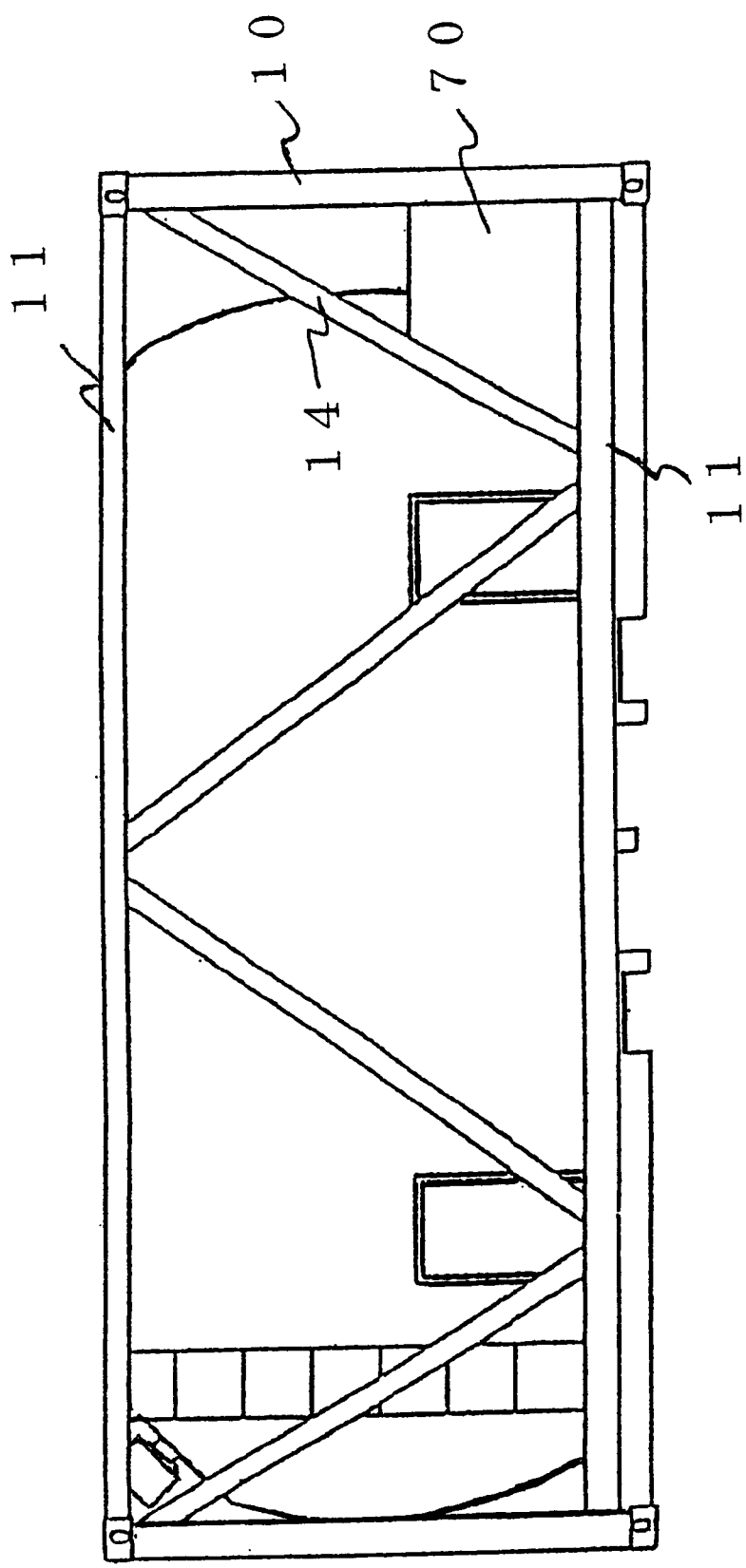
FIG. 11 shows the position of a side protective door 70 in a side view of the tank type container 1 of the present invention.

In the tank type container 1 of the present invention, the container frame may have a protective door at the back lower portion in order to protect the discharging tube 21, the air-blowing tube 29, the air-injecting tube 28, the safety valve 35, etc. all provided at the back lower portion of the container 1. In FIG. 11, a side protective door 70 is provided at the side of the back lower portion of the container. This side protective door 70 can be provided at the left and right sides of the container frame. The side protective door 70 is provided at the side of the back lower portion of the container 1, surrounded by the vertical pipe 10, the diagonal brace pipe 14 and the horizontal pipe 11. The side protective door 70 is fitted to the vertical pipe via a hinge so as to allow opening and closing, has a knob at a place close to the pipe 14, and can be opened at the pipe 14 toward the back of FIG. 11. The side protective door 70 may have a metal member for locking or may be locked (that situation is not shown in the figures) so as to enable free opening or closing in the closed state. The side protective door 70 may also have an opening to see the inside therethrough.

Figure 12:
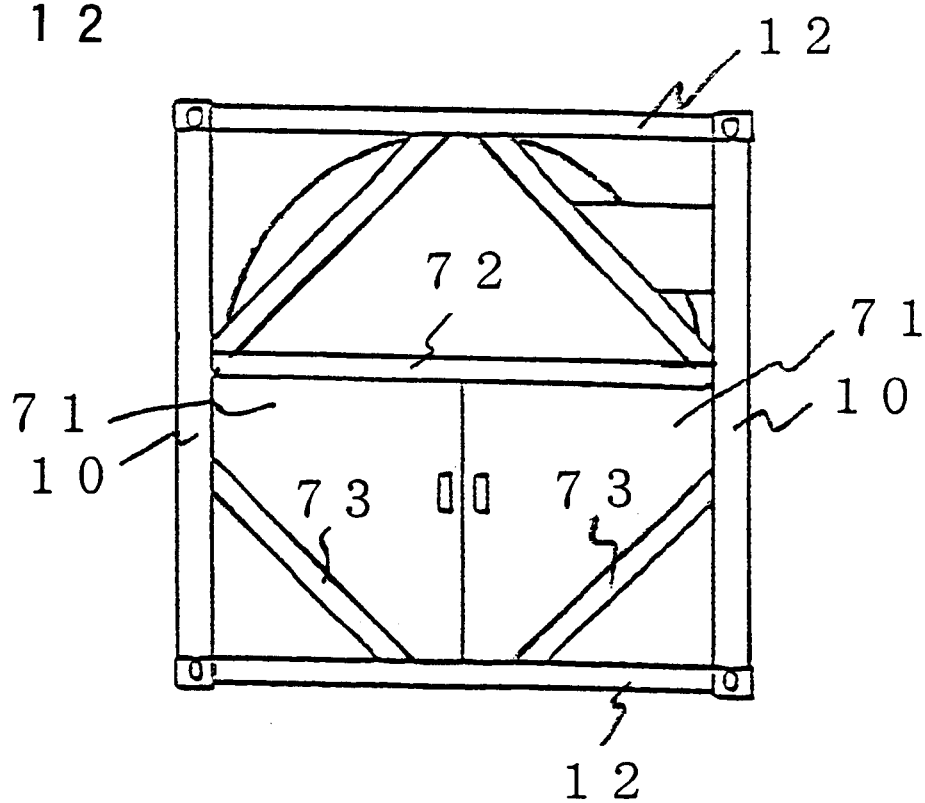
FIG. 12 shows the position of a back protective door 71 at the back side of the tank type container 1 of the present invention.
Figure 13:
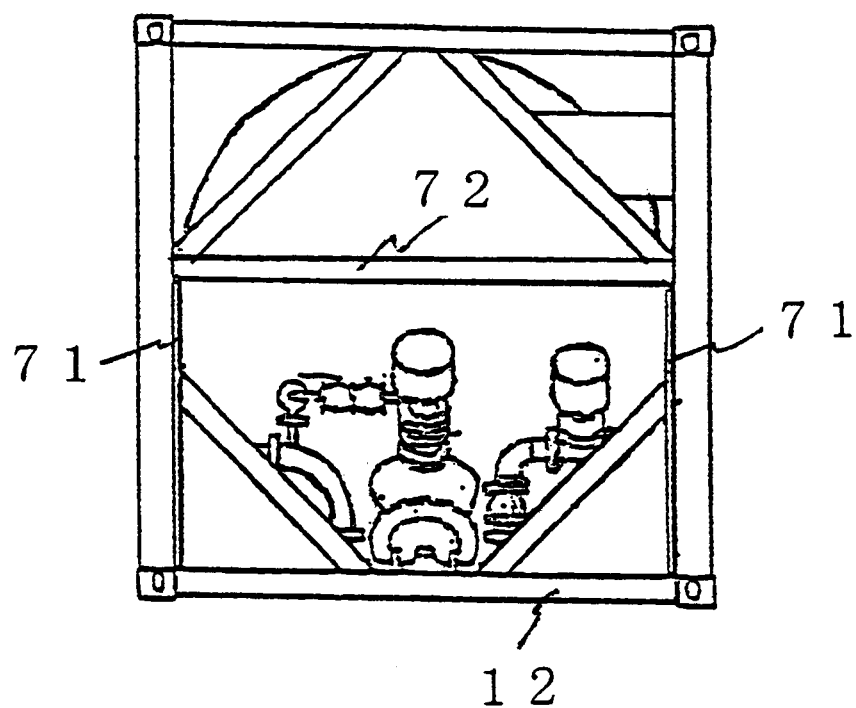
FIG. 13 shows a state in which the back protective door 71 of FIG. 12 is in an open state.

Also, a back protective door 71 may be provided at the back side of the container 1, as shown in FIG. 12, for the same purpose as mentioned for FIG. 11. The back protective door 71 shown in FIG. 12 is constituted so as to enable opening to the left and right at center, and is fitted to the left and right vertical pipes 10 via hinges. FIG. 13 shows a state in which the back protective door 71 is opened. The back protective door 71, when closed, is surrounded by the left and right vertical pipes 10, the connecting pipe 12, a holding pipe 72 and the left and right diagonal brace pipes 73, and can be opened at the center. Desirably, the back protective door 71 is provided with clamps or the like (not shown in the figures) at the upper center for fitting to the holding pipe 72 and also at the lower center for fitting to the connecting pipe 12, in order to prevent the movement or vibration of the door in the closed state. The back protective door 71 may have a projection for locking, for prevention of free opening or closing.

As mentioned above, provision of the side protective door 70 and the back protective door 71 can ensure physical protection for the discharging tube, the air-blowing tube, the air-injecting tube, the safety valve, etc. all positioned at the back lower portion of the tank, allows for prevention of mischief from outside and robbery of in-tank resin, and can protect the tank and its belongings safely.

Function

The tank type container 1 can be mounted on the trailer 2 by raising the container 1 by a forklift at a filling factory, a storehouse or the like, or by lifting the container 1 by a crane at a harbor or the like. The tank type container of the present invention can be mounted easily by any of these methods.

In mounting by a forklift, the nails of the forklift are inserted into the spaces S1 or S2 of the container 1 of FIG. 1 provided for allowing the insertion of the nails; and the container 1 is raised by the forklift in order to mount it on the bed 4 or take it down from the bed 4. The inner spaces S2 of small width are used when an unfilled tank type container 1 is handled; the outer spaces S1 of large width are used when a filled tank type container 1 is handled, and can ensure safety.

In lifting by a crane or a gantry crane at a harbor or the like, the tank type container 1 is ordinarily lifted by, as shown in FIG. 1, fitting a frame-shaped jig 40 (a lifting jig) having the same mushroom-shaped locking nails 7 as possessed by the trailer 2, to a lifting wire and then engaging the locking nails 7 with the metal fitting members 6 for locking provided at the top of the container 1.

In filling polycarbonate resin pellets into the tank 3, the front portion of the bed 4 is raised so that the bed 4 is inclined by about 45° as shown in FIG. 3: the charging tube 20 directed upward is connected to a hopper (for supplying polycarbonate resin pellets) or the like, via a flexible connecting tube 41 shown by a dotted line; and polycarbonate resin pellets are charged into the tank 3 from the charging tube 20. In that case, the switching valve 37 of the discharging tube 21 is in a closed state. After the charging, an external compressed air source (e.g. an air compressor) (not shown) is connected via a hose (not shown in figures); air is appropriately sent into the tank 3 under pressure to pressurize the tank inside; thereby, the vibration of polycarbonate resin pellets during transportation can be suppressed and the generation of a fine powder can be prevented. The pressurization of the tank inside is desirably achieved by filling the tank inside with dried air or an inert gas of $0.2 \times 10^5$ to $0.8 \times 10^5$ Pa.

In discharging polycarbonate resin pellets from inside the tank 3, the front portion of the bed 4 is raised so that the bed 4 is inclined by about 45° as shown in FIG. 3; simultaneously therewith, the discharging tube 21 is connected to a receiving hopper 48 (this hopper may be a silo) via a flexible hose 47 such as metal (stainless steel, in particular)-made hose. Further, to the air-blowing tube 29 of FIG. 2 is connected an external compressed air source (e.g. an air compressor) via a hose (not shown in figures), to send air under pressure to the anterior air-injecting tube 27 and the posterior air-injecting tube 28 via the tubes 30 and 31 for sensing air under pressure. Inside the hopper 25, compressed air is injected from the air-injecting tube 28 as shown in FIG. 8; thereby, the polycarbonate resin pellets are sent under pressure into the discharging tube 21 and discharged therethrough into the receiving hopper 48 of FIG. 3. Meanwhile, compressed air is injected into the tank 3 at the front top from the anterior air-injecting tube 27; thereby, the inside of the tank 3 is pressurized and simultaneously therewith the polycarbonate resin pellets are quickly pushed downward; as a result, the loss of compressed air from the posterior air-injecting tube 28 is prevented and the discharging of polycarbonate resin pellets is promoted.

As thermoplastic resins, there can be mentioned a polycarbonate resin according to the present invention, polyolefin resins (e.g. polyethylene resin and polypropylene resin), acrylic resins, styrene resins, ABS resins, polyamide resins, polyester resins (e.g. polyethylene terephthalate resin, polyethylene naphthalate resin and polybutylene terephthalate resin), polycarbonate resins, vinyl chloride resins, etc. In the present invention, a polycarbonate resin is used as mentioned previously.

The polycarbonate resin pellets used in the present invention can be polycarbonate resin pellets used for molding and, in particular, those used for molding of optical material, and the shape and size thereof are not critical. The shape of the pellets includes a columnar shape, a spherical shape, a rectangular shape, a cocoon shape, etc. A columnar shape having a diameter of 2.0 to 3.3 mm and a length of 2.5 to 3.5 mm is appropriate.

In polycarbonate resin pellets for optical use, collision between the pellets caused by vibration during transportation and resultant generation of a fine powder has heretofore been unavoidable as mentioned previously. When such a fine powder is present in a certain amount or more in the polycarbonate resin pellets for optical use to be molded, the optical disc molded from the pellets has silver streaks, carbides, etc. and has various defects as a recording material. Meanwhile, with the container of the present invention, even when polycarbonate resin pellets for optical use are subjected to long-term transportation (particularly, marine transportation), generation of a fine powder can be minimized.

The polycarbonate resin is produced ordinarily by reacting a dihydric phenol with a carbonate precursor in a solvent (interfacial polymerization) or in a molten state (melt polymerization). The basic operations of these production processes are described briefly.

In the interfacial polymerization using, for example, phosgene as the carbonate precursor, a reaction is conducted ordinarily in the presence of an acid binding agent and a solvent. As the acid binding agent, there is used, for example, an alkali metal hydroxide (e.g. sodium hydroxide or potassium hydroxide) or an amine compound (e.g. pyridine). As the solvent, there is used, for example, a halogenated hydrocarbon such as methylene chloride, chlorobenzene or the like. Also, a catalyst such as tertiary amine, quaternary ammonium salt or the like can be used for promotion of the reaction. The temperature of the reaction is ordinarily 0 to 40° C., and the time of the reaction is several minutes to 5 hours.

In the melt polymerization (ester interchange) using a carbonic acid diester as the carbonate precursor, given proportions of a dihydric phenol and a carbonic acid diester are stirred in an inert gas atmosphere with heating, and the phenol formed is distilled off. The temperature of the reaction differs depending upon the boiling point of the phenol formed, etc. But is ordinarily 120 to 300° C. The reaction is conducted under vacuum from the start and is completed while the phenol formed is distilled off. To promote the reaction, a catalyst used in ordinary ester interchange can be used. As the carbonic acid diester used in the ester interchange, there can be mentioned, for example, diphenyl carbonate, dinaphthyl carbonate and bis(diphenyl) carbonate. Of these, diphenyl carbonate is particularly preferred.

As representative examples of the dihydric phenol, there can be mentioned 2,2-bis(4-hydroxyphenyl)propane (bisphenol A), bis(4-hydroxyphenyl)methane, 1,1-bis(4-hydroxyphenyl)ethane, 2,2-bis(4-hydroxy-3,5-dimethylphenyl)propane, 2,2-(4-hydroxy-3-methylphenyl)propane and bis(4-hydroxyphenyl)sulfone. Of these, bis(4-hydroxyphenyl)alkanes are preferred, and bisphenol A is particularly preferred.

In producing the polycarbonate resin, the above-mentioned dihydric phenols can be used singly or in admixture of two or more kinds. There can also be used appropriately a molecular weight modifier, a branching agent, a catalyst as a reaction promoter, etc. The polycarbonate resin obtained may be used as an admixture of two or more kinds.

The molecular weight of the polycarbonate resin is preferably 10,000 to 22,000, more preferably 12,000 to 20,000, particularly preferably 13,000 to 18,000 in terms of viscosity-average molecular weight. A polycarbonate resin having such a viscosity-average molecular weight is preferred because it has a sufficient strength as an optical material, particularly as an optical disc material, shows good melt flowability during molding, and gives rise to no molding strain.

EXAMPLES 1 AND 2

Polycarbonate resin pellets having a columnar shape of 2.93 mm in diameter and 3.0 mm in length, synthesized by interfacial polymerization (Example 1) or melt polymerization (Example 2) were filled into the tank of a tank type container of FIG. 1 for polycarbonate resin pellets, and subjected to marine transportation for 30 hours. The polycarbonate resin pellets in the tank were discharged at the destination and observed for the amount of a fine powder generated. The amount of a fine powder of 1 mm or less in particle diameter was 200 ppm or less.

COMPARATIVE EXAMPLE 1

Figure 10:
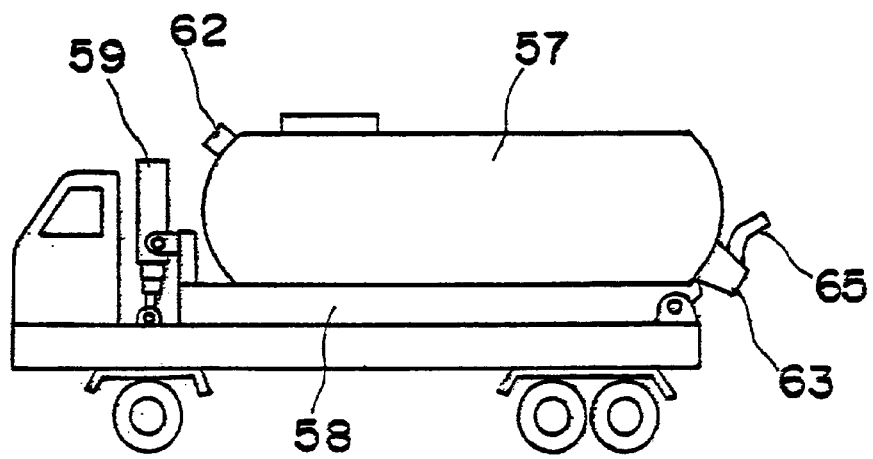
FIG. 10 is a side view of a conventional tank lorry for polycarbonate resin pellets.

The polycarbonate resin pellets of Example 1 were filled into the tank of a tank lorry of FIG. 10, and subjected to land transportation for 30 hours. The polycarbonate resin pellets in the tank were discharged at the destination and observed for the amount of a fine powder generated. The amount of a fine powder of 1 mm or less in particle diameter was 600 ppm or more.

Effects of the Invention

As described above, the following advantages are brought about by the present invention.

(1) The tank type container 1 for polycarbonate resin pellets of the present invention comprises a long, horizontally placed, drum-shaped tank 3 and a parallelopiped container frame 5 surrounding the tank 3. The container frame 5 is provided, at the bottom, with metal fittings 6 for locking engagable with a locking mechanism possessed by the bed of a trailer or the like. Therefore, the long tank 3 of large capacity can be subjected to any of land transportation by a trailer and marine transportation by a container ship, whereby an increased transportation efficiency is obtained.

(2) The tank 3 is provided with a charging tube 20 at the top of the longitudinal front end, a discharging tube 21 at the bottom of the longitudinal back end, and an air-supplying apparatus for supplying compressed air into the tank 3, at the outside. The tank 3, the charging tube 20, the discharging tube 21 and the air-supplying apparatus are surrounded by the container frame 5 without protruding from the container frame 5. Therefore, the tank 3 can efficiently discharge polycarbonate resin pellets outside, can be used for both land transportation and marine transportation as mentioned above, is easy to handle, and can be protected from damage caused by, for example, collision with outside during handling.

(3) The charging tube 20 is provided at the top of the tank front end and the discharging tube 21 is provided at the bottom of the tank back end. Therefore, when the tank 3 is in a dumping state in which the tank front end is elevated, the charging tube 20 is located at the highest position and the discharging tube 21 is located at the lowest position; as a result, polycarbonate resin pellets can be filled into the tank compactly and efficiently and also can be discharged smoothly.

(4) The charging tube 20 is directed forward and upward and the discharging tube 21 is directed backward and upward. Therefore, when the tank 3 is in a dumping state in which the tank front end is elevated, the charging tube 20 is directed upward and the discharging tube 21 is directed approximately horizontally and backward. As a result, when the tank 3 is mounted on a dumping type trailer, it is easy to connect the charging tube 20 with a hopper for feeding polycarbonate resin pellets when the pellets are fed, or to connect the discharging tube 21 with a receiving hopper when the pellets are discharged.

(5) The tank 3 is provided with compressed air-injecting tubes 27 and 28 at the top of the tank front end and at the bottom of the tank back end. Thereby, the polycarbonate resin pellets in the tank 3 can be discharged quickly and sufficiently, although the tank 3 has a large capacity.

(6) In the tank type container of the present invention, compressed air can be sent into the tank. Therefore, even when polycarbonate resin pellets for optical use are subjected to long-term transportation, the pressure of the compressed air can suppress vibration of the pellets and prevent generation of a fine powder. Thus, the present container is suitable for transportation of polycarbonate resin pellets for optical use (e.g. CD, CD-ROM, CD-R, MO, PD, DVD, DVD-ROM, DVD-R and DVD-RAM).

EXPLANATION OF NUMERALS

1: Tank type container
2: Trailer
3: Tank
4: Bed
5: Container frame
6: Metal fitting member for locking
7: Locking member (locking mechanism)
16: Long hole
20: Charging tube
21: Discharging tube
27, 28: Air-injecting tubes
29: Air-blowing tube
30,31: Tubes for sending air under pressure

What is claimed is:

1. A tank type container for polycarbonate resin pellets, comprising a long, horizontally placed, drum-shaped tank and a parallelopiped container frame surrounding the tank, wherein the tank is provided with a charging tube at the top of the longitudinal front end, a discharging tube at the bottom of the longitudinal back end, and an air-supplying apparatus for supplying compressed air into the tank, at the outside, the tank, the charging tube, the discharging tube and the air-supplying apparatus are accommodated in a space surrounded by the container frame, the container frame is provided, at the bottom corners, with metal fitting members for locking engagable with a locking mechanism possessed by the bed of a trailer, and the charging tube is projected forward and upward from the tank, the discharging tube is projected backward and upward from the tank, and when the tank is inclined in such a state that the front end is elevated, the charging tube is directed upward and the discharging tube is directed almost horizontally and backward.

2. A tank type container for polycarbonate resin pellets according to claim 1, wherein the air-supplying apparatus comprises air-injecting tubes provided at the front end top of the tank and the back end bottom of the tank, an air-blowing tube connected to a compressed air source, provided at the back of the tank, and tubes for sending air under pressure, provided along the surface of the tank so as to diverge from the air-blowing tube and extend as far as each air-injecting tubes.

3. A method for transporting polycarbonate resin pellets using a tank type container set forth in claim 1.

* * * * *

UNITED STATES PATENT AND TRADEMARK OFFICE
CERTIFICATE OF CORRECTION

PATENT NO.    : 6,508,378 B1
DATED         : January 21, 2003
INVENTOR(S)   : Kenichi Maeda et al.

It is certified that error appears in the above-identified patent and that said Letters Patent is hereby corrected as shown below:

<u>Title page</u>,
Item [30], Foreign Application Priority Data, delete "Nov. 1, 1999", insert -- Jan. 11, 1999 --.

Signed and Sealed this

Seventh Day of September, 2004

JON W. DUDAS
*Director of the United States Patent and Trademark Office*